United States Patent
Yiu et al.

(10) Patent No.: US 10,447,370 B2
(45) Date of Patent: Oct. 15, 2019

(54) SYSTEMS, METHODS AND DEVICES FOR USING S-MEASURE WITH NEW RADIO

(71) Applicant: INTEL IP CORPORATION, Santa Clara, CA (US)

(72) Inventors: Candy Yiu, Portland, OR (US); Jie Cui, Santa Clara, CA (US); Yang Tang, San Jose, CA (US); Youn Hyoung Heo, Seoul (KR)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/173,586

(22) Filed: Oct. 29, 2018

(65) Prior Publication Data

US 2019/0074887 A1 Mar. 7, 2019

Related U.S. Application Data

(60) Provisional application No. 62/582,844, filed on Nov. 7, 2017.

(51) Int. Cl.

| H04W 76/27 | (2018.01) |
| H04B 7/06 | (2006.01) |
| H04B 17/327 | (2015.01) |
| H04W 24/10 | (2009.01) |
| H04L 5/00 | (2006.01) |

(52) U.S. Cl.
CPC ......... *H04B 7/0626* (2013.01); *H04B 17/327* (2015.01); *H04W 24/10* (2013.01); *H04W 76/27* (2018.02); *H04L 5/005* (2013.01)

(58) Field of Classification Search
CPC .... H04W 76/27; H04W 24/10; H04B 17/309; H04B 7/0626; H04L 5/005
USPC .......................... 375/219–222, 354, 356–357
See application file for complete search history.

(56) References Cited

U.S. PATENT DOCUMENTS

| 2015/0092566 A1* | 4/2015 | Balachandran | H04W 8/22 370/242 |
| 2018/0049113 A1* | 2/2018 | Jung | H04L 5/0048 |
| 2018/0219664 A1* | 8/2018 | Guo | H04L 5/0053 |
| 2018/0279358 A1* | 9/2018 | Babaei | H04W 72/0453 |
| 2018/0302889 A1* | 10/2018 | Guo | H04W 72/046 |
| 2018/0332520 A1* | 11/2018 | Cheng | H04W 36/0058 |
| 2018/0351611 A1* | 12/2018 | Nagaraja | H04B 7/0417 |
| 2018/0368034 A1* | 12/2018 | Lin | H04L 5/00 |
| 2019/0053271 A1* | 2/2019 | Islam | H04L 5/0048 |

(Continued)

*Primary Examiner* — Emmanuel Bayard
(74) *Attorney, Agent, or Firm* — Stoel Rives LLP

(57) ABSTRACT

A new radio (NR) capable user equipment (UE) to determine whether to skip cellular measurements using s-Measure configuration based on measurements of a synchronization signal (SS) block (SSB) and/or Channel State Information Reference Signal (CSI-RS) using an s-Measure configuration. For example, an s-Measure configuration can include a reference signal received power (RSRP) value and an indicator whether to apply the value to an NR SS block or a CSI-RS. If the value meets or exceeds the measurement for the indicated signal measurement, the s-Measure is satisfied. For example, in an embodiment, the network configures a single s-Measure configuration (e.g., either an NR SS s-Measure configuration or a CSI-RS s-Measure configuration), which when satisfied the UE does not perform further measurements.

20 Claims, 10 Drawing Sheets

(56) References Cited

U.S. PATENT DOCUMENTS

| | | | |
|---|---|---|---|
| 2019/0074886 A1* | 3/2019 | Yoon | H04B 17/318 |
| 2019/0089442 A1* | 3/2019 | Akoum | H04B 7/0632 |
| 2019/0110300 A1* | 4/2019 | Chen | H04L 5/0048 |
| 2019/0149253 A1* | 5/2019 | Yoon | H04B 7/26 |

\* cited by examiner

US 10,447,370 B2

SYSTEMS, METHODS AND DEVICES FOR USING S-MEASURE WITH NEW RADIO

RELATED APPLICATION

This application claims the benefit under 35 U.S.C. § 119(e) of U.S. Provisional Application No. 62/582,844 filed Nov. 7, 2017, which is hereby incorporated by reference herein in its entirety.

TECHNICAL FIELD

The present disclosure relates to cellular measurements and more specifically to determining whether to skip cellular measurements using s-Measure configuration with a new radio (NR) capable user equipment (UE) that can use a synchronization signal (SS) block (SSB) and/or Channel State Information Reference Signal (CSI-RS).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
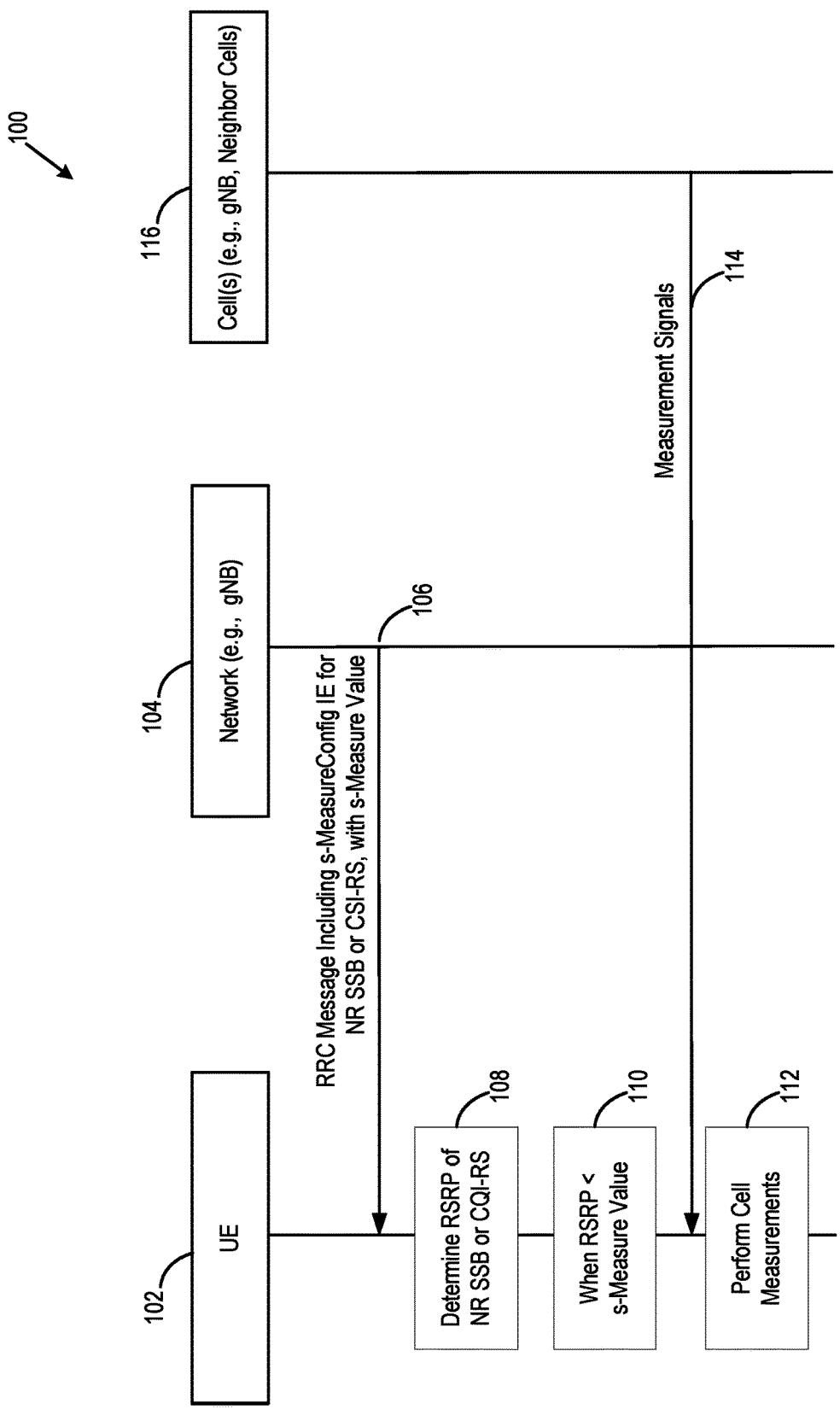
FIG. 1 is a ladder diagram illustrating a system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a new radio (NR) capable user equipment (UE) to determine whether to skip cellular measurements using s-Measure configuration with a synchronization signal (SS) block (SSB) and/or Channel State Information Reference Signal (CSI-RS). For example an s-Measure configuration can include a reference signal received power (RSRP) value and an indicator whether to apply the value to an NR SS block or a CSI-RS. If the value meets or exceeds the measurement for the indicated signal measurement, the s-Measure is satisfied.

In a first embodiment, if either s-Measure configuration is satisfied (NR SS s-Measure configuration or CSI-RS s-Measure configuration), the UE does not need to perform further measurements. In a second embodiment, if both s-Measure configurations are satisfied, the UE does not perform further measurements. In a third embodiment, the network configures a single s-Measure configuration (e.g., either NR SS s-Measure configuration or CSI-RS s-Measure configuration), which when satisfied, the UE does not perform further measurements. In a fourth embodiment, the UE does not perform further measurements of SS blocks, if an SS block s-Measure configuration is satisfied. The UE does not perform further measurements of CSI-RS, if a CSI-RS s-Measure configuration is satisfied.

In Long Term Evolution (LTE), there is one s-Measure configuration. The s-Measure configuration may be included in a Measurement Configuration (MeasConfig) information element (IE) of a Radio Resource Control (RRC) message; the MeasConfig IE may include an s-Measure field/IE with an s-Measure value. An s-Measure value of "0" may indicate to disable s-Measure and/or that s-Measure is not configured.

If s-Measure is configured, s-Measure defines when a user equipment (UE) is required to perform measurements. When configured, the UE may compare the cell measurement of the RSRP value with the s-Measure value, and if the cell measurement is above the s-Measure value, the UE is not required to perform other measurement(s). In LTE, s-Measure may indicate a primary cell (PCell) quality threshold controlling whether or not the UE is required to perform intra-frequency measurements, inter-frequency measurements, and inter-Radio Access Technology (RAT) neighboring cell measurements. However, the UE is allowed to perform measurements when the PCell RSRP exceeds the s-Measure value.

In some new radio (NR) systems, s-Measure may be configured for both NR synchronization signal (SS) block (SSB) and/or Channel State Information Reference Signal (CSI-RS). However, it is unclear what the UE behavior is when both s-Measures are configured and/or when an s-Measure is configured for an SSB and when an s-Measure is configured for CSI-RS.

Embodiments herein provide UE behaviors for different configurations of s-Measure on NR SS block and CSI-RS. Embodiments may include the following options: option 1: if either s-Measure is satisfied, the UE does not need to perform measurement; option 2: if both s-Measures are satisfied, the UE does not measure; option 3: the network can only configure one s-Measure; or option 4: the UE does not measure further SS blocks if the SS block s-Measure is satisfied. The UE does not measure further CSI-RS, if the CSI-RS s-Measure is satisfied.

In embodiment 1, if the SS block s-Measure or CSI-RS s-Measure is satisfied, the UE does not need to perform measurement. In this embodiment, either one of the s-Measures (corresponding to SS block or CSI-RS) can be satisfied. The UE is not required to perform both SS block measurement or CSI-RS measurement.

For example, s-Measure satisfied for an SS block means the UE performs cell-level measurement on SS block, and the value of the RSRP of the cell-level measurement is above the s-Measure configured value. Similarly for CSI-RS, the UE performs cell-level measurement on CSI-RS, and the s-Measure is satisfied for CSI-RS if the value of the RSRP of the cell-level measurement is above the s-Measure configured value.

In embodiment 2, if both SS block and CSI-RS s-Measure are satisfied, then UE is not required to perform measurement. In this case, the SS block cell-level measurement is greater than the s-Measure_SS block and the CSI-RS cell-level measurement is greater than the s-Measure_CSI-RS, then the UE is not required to perform measurement on SS block and CSI-RS.

In embodiment 3, the network can only configure one s-Measure configuration. In this embodiment, the network can configure either SS Block s-Measure or CSI-RS s-Measure (i.e., network cannot configure both at the same time).

In embodiment 4, the UE does not measure SS block if SS block s-Measure is satisfied. The UE does not measure CSI-RS if CSI-RS s-Measure is satisfied. In this case, the SS block s-Measure is corresponding to further SS block measurement while CSI-RS s-Measure is corresponding to further CSI-RS measurement. When the network configures SS block s-Measure and it is satisfied, the UE is not required to perform SS block measurement only. Similarly, when the network configures CSI-RS s-Measure and it is satisfied, the UE is not required to perform CSI-RS measurement only.

FIG. 1 is a ladder diagram illustrating a system 100 consistent with embodiments disclosed herein. A UE 102 is in communication with a network 104, such as a gNB. The UE 102 can measure signals from cell(s) 116, such as neighbor cells, gNBs, etc. The network 104 transmits an RRC message 106 that includes an s-MeasureConfig information element (IE) for NR SSB or CSI-RS with an s-Measure value. The UE 102 determines 108 an RSRP of either or both NR SSB or CSI-RS. When the RSRP is determined 110 to be less than the s-Measure value, the UE 102 performs additional measurements 112 using measurement signals 114 (which can be signals from neighboring cells such as NR SSB or CSI-RS).

Figure 2:
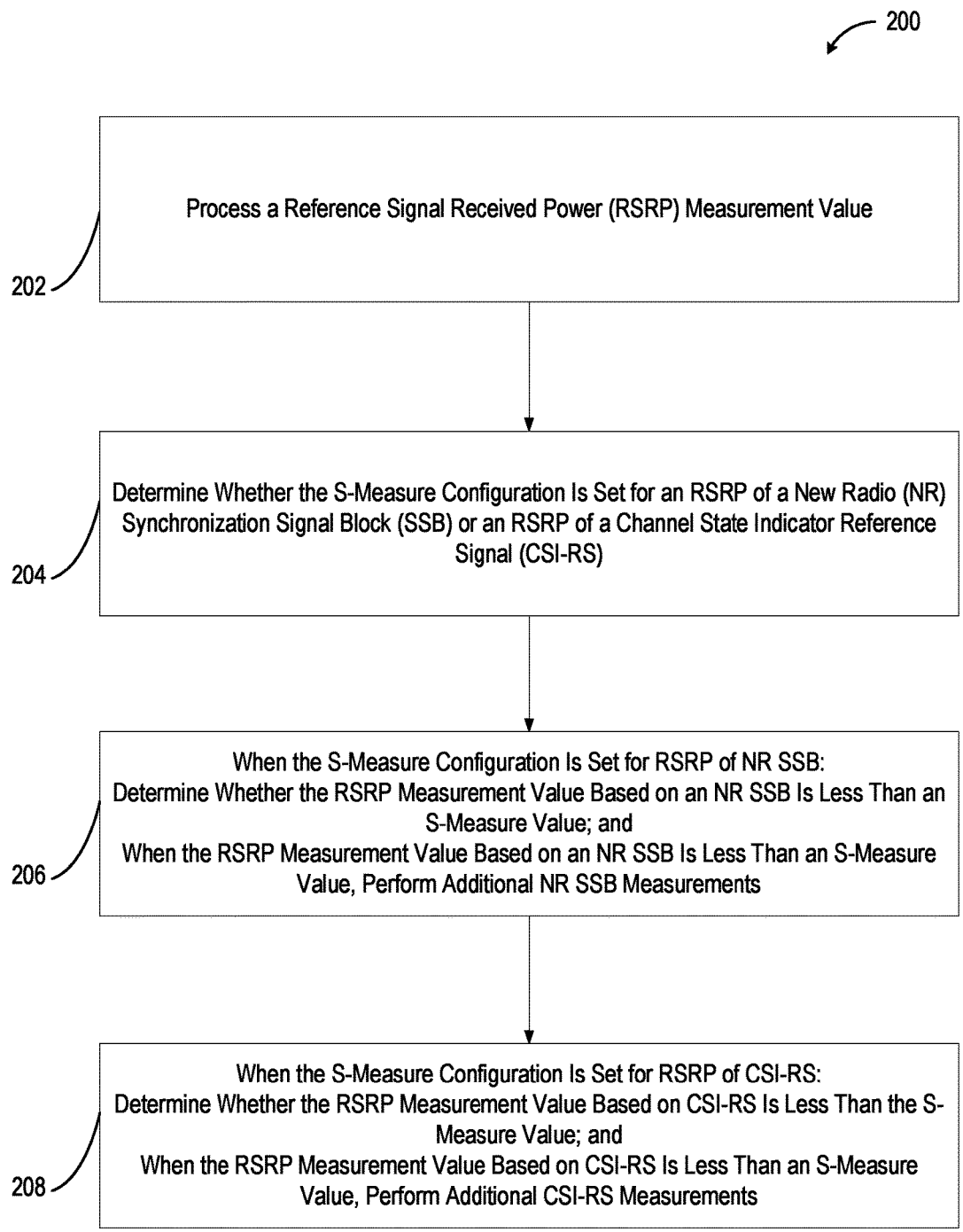
FIG. 2 is a flowchart illustrating a method of determining whether to perform cellular measurements consistent with embodiments disclosed herein.

FIG. 2 is a flowchart illustrating a method 200 of determining whether to perform cellular measurements consistent with embodiments disclosed herein. The method can be accomplished by systems such as those shown in FIG. 4 including UE 401, RAN node 411 and RAN node 412. In block 202, the UE processes a reference signal received power (RSRP) measurement value. In block 204, the UE determines whether the s-Measure configuration is set for an RSRP of a new radio (NR) synchronization signal block (SSB) or an RSRP of a channel state indicator reference signal (CSI-RS). In block 206, when the s-Measure configuration is set for RSRP of NR SSB: the UE determines whether the RSRP measurement value based on an NR SSB is less than an s-Measure value; and when the RSRP measurement value based on an NR SSB is less than an s-Measure value, the UE performs additional NR SSB measurements. In block 208, when the s-Measure configuration is set for RSRP of CSI-RS: the UE determines whether the RSRP measurement value based on a CSI-RS is less than the s-Measure value; and when the RSRP measurement value based on a CSI-RS is less than an s-Measure value, the UE performs additional CSI-RS measurements.

In some embodiments, the network applies the procedure as follows to ensure that, whenever the UE has a measConfig, it includes a measObject for the SpCell and for each NR SpCell to be measured. The UE shall if the received measConfig includes the s-MeasureConfig: if s-MeasureConfig is set to ssb-RSRP, set parameter ssb-RSRP of s-MeasureConfig within VarMeasConfig to the lowest value of the RSRP ranges indicated by the received value of s-MeasureConfig. Else, the UE shall set parameter csi-RSRP of s-MeasureConfig within VarMeasConfig to the lowest value of the RSRP ranges indicated by the received value of s-MeasureConfig.

In some embodiments, the UE shall 1> for each measId included in the measIdList within VarMeasConfig: 2> if the reportType for the associated reportConfig is periodical or eventTriggered: 3> if a measurement gap configuration is set up, or 3> if the UE does not require measurement gaps to perform the concerned measurements: 4> if s-MeasureConfig is not configured, or 4> if s-MeasureConfig is set to ssb-RSRP and the NR SpCell RSRP based on SS/PBCH block, after layer 3 filtering, is lower than ssb-RSRP,or 4> if s-MeasureConfig is set to csi-RSRP and the NR SpCell RSRP based on a CSI-RS, after layer 3 filtering, is lower than csi-RSRP: 5> if the measObject is associated to NR and the rsType is set to csi-rs: 6> if reportQuantityRsIndexes and maxNrofRSIndexesToReport for the associated reportConfig are configured: 7> derive layer 3 filtered beam measurements only based on a CSI-RS for each measurement quantity indicated in reportQuantityRsIndexes.

In some embodiments, the UE shall do the above and 6> derive cell measurement results based on a CSI-RS for each trigger quantity and each measurement quantity indicated in reportQuantityCell using parameters from the associated measObject.

In some embodiments, the UE shall do the above and 5> if the measObject is associated to NR and the rsType is set to ssb: 6> if reportQuantityRsIndexes and maxNrofRSIndexesToReport for the associated reportConfig are configured: 7> derive layer 3 beam measurements only based on SS/PBCH block for each measurement quantity indicated in reportQuantityRsIndexes.

In some embodiments, the UE shall do the above and 6> derive cell measurement results based on SS/PBCH block for each trigger quantity and each measurement quantity indicated in reportQuantityCell using parameters from the associated measObject.

In some embodiments as RRC information elements (IEs), the IE MeasConfig specifies measurements to be performed by the UE, and covers intra-frequency, inter-frequency and inter-RAT mobility as well as configuration of measurement gaps. For example: MeasConfig :: s-MeasureConfig CHOICE {ssb-RSRP, RSRP-Range; csi-RSRP, RSRP-Range} OPTIONAL, — Need M s-MeasureConfig can be a threshold for NR SpCell RSRP measurement controlling when the UE is required to perform measurements on non-serving cells. Choice of ssb-RSRP corresponds to cell RSRP based on SS/PBCH block, and choice of csi-RSRP corresponds to cell RSRP of CSI-RS. The UE is only required to perform measurements on non-serving cells when the SpCell RSRP is below that threshold.

In some embodiments as UE variables, the UE variable VarMeasConfig includes the accumulated configuration of the measurements to be performed by the UE, covering intra-frequency, inter-frequency and inter-RAT mobility-related measurements. For example: VarMeasConfig ::=s-MeasureConfig CHOICE {ssb-RSRP, RSRP-Range; csi-RSRP, RSRP-Range}.

Figure 3:
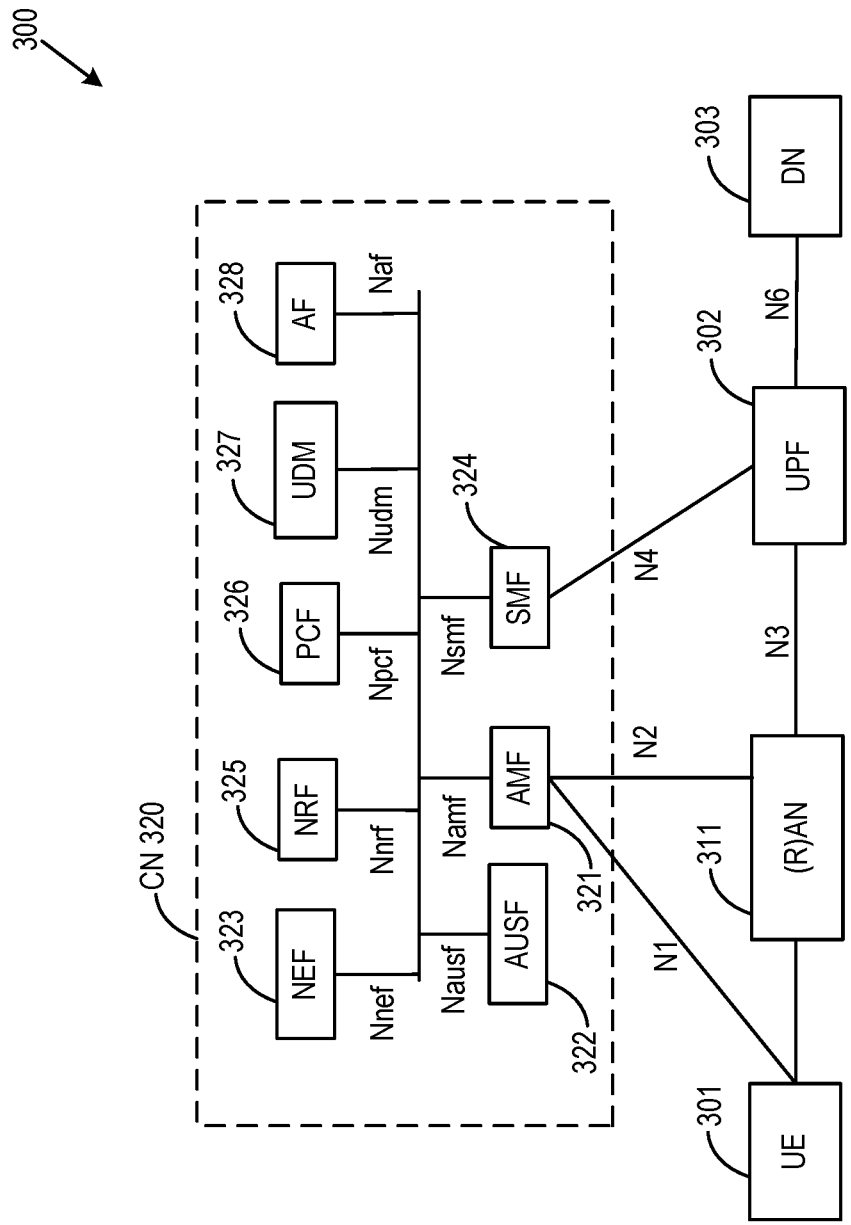
FIG. 3 illustrates an architecture of a system of a network in accordance with some embodiments disclosed herein.

FIG. 3 illustrates an architecture of a system 300 of a network in accordance with some embodiments. The system 300 is shown to include a UE 301, which may be the same or similar to UEs 401 and 402 discussed previously; a RAN node 311, which may be the same or similar to RAN nodes 411 and 412 discussed previously; a User Plane Function (UPF) 302; a Data network (DN) 303, which may be, for example, operator services, Internet access or 3rd party services; and a 5G Core Network (5GC or CN) 320.

The CN 320 may include an Authentication Server Function (AUSF) 322; a Core Access and Mobility Management Function (AMF) 321; a Session Management Function (SMF) 324; a Network Exposure Function (NEF) 323; a Policy Control function (PCF) 326; a Network Function (NF) Repository Function (NRF) 325; a Unified Data Management (UDM) 327; and an Application Function (AF) 328. The CN 320 may also include other elements that are not shown, such as a Structured Data Storage network function (SDSF), an Unstructured Data Storage network function (UDSF), and the like.

The UPF 302 may act as an anchor point for intra-RAT and inter-RAT mobility, an external protocol data unit (PDU) session point of interconnect to DN 303, and a branching point to support multi-homed PDU session. The UPF 302 may also perform packet routing and forwarding, packet inspection, enforce user plane part of policy rules, lawfully intercept packets (UP collection); traffic usage reporting, perform Quality of Service (QoS) handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 302 may include an uplink classifier to support routing traffic flows to a data network. The DN 303 may represent various network operator services, Internet access, or third party services. DN 303 may include, or be similar to application server 430 discussed previously.

The AUSF 322 may store data for authentication of UE 301 and handle authentication related functionality. The AUSF 322 may facilitate a common authentication framework for various access types.

The AMF 321 may be responsible for registration management (e.g., for registering UE 301, etc.), connection management, reachability management, mobility management, and lawful interception of AMF-related events, and access authentication and authorization. AMF 321 may provide transport for SM messages between and SMF 324, and act as a transparent proxy for routing SM messages. AMF 321 may also provide transport for short message service (SMS) messages between UE 301 and an SMS function (SMSF) (not shown by FIG. 3). AMF 321 may act as Security Anchor Function (SEA), which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a Security Context Management (SCM) function, which receives a key from the SEA that it uses to derive access-network specific keys. Furthermore, AMF 321 may be a termination point of RAN CP interface (N2 reference point), a termination point of non-access stratum (NAS) (N1) signalling, and perform NAS ciphering and integrity protection.

AMF 321 may also support NAS signalling with a UE 301 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 301 and AMF 321, and relay uplink and downlink user-plane packets between the UE 301 and UPF 302. The N3IWF also provides mechanisms for IPsec tunnel establishment with the UE 301.

The SMF 324 may be responsible for session management (e.g., session establishment, modify and release, including tunnel maintain between UPF and AN node); UE Internet Protocol (IP) address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 324 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using a standardized interfaces. The stored information can then be re-exposed by the NEF 323 to other NFs and AFs, and/or used for other purposes such as analytics.

The NRF 325 may support service discovery functions, receive NF Discovery Requests from NF instances, and provide the information of the discovered NF instances to the NF instances. NRF 325 also maintains information of available NF instances and their supported services.

The PCF 326 may provide policy rules to control plane function(s) to enforce them, and may also support unified policy framework to govern network behavior. The PCF 326 may also implement a front end (FE) to access subscription information relevant for policy decisions in a User Data Repository (UDR) of UDM 327.

The UDM 327 may handle subscription-related information to support the network entities' handling of communication sessions, and may store subscription data of UE 301. The UDM 327 may include two parts, an application FE and a User Data Repository (UDR). The UDM may include a UDM-FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 326. UDM 327 may also support SMS management, wherein an SMS-FE implements the similar application logic as discussed previously.

The AF 328 may provide application influence on traffic routing, access to the Network Capability Exposure (NCE), and interact with the policy framework for policy control. The NCE may be a mechanism that allows the 5GC and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for notification procedure that the UE 301 is available for SMS transfer (e.g., set a UE not reachable flag, and notifying UDM 327 when UE 301 is available for SMS).

The system 300 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 300 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 320 may include an Nx interface, which is an inter-CN interface between the MME (e.g., MME 421) and the AMF 321 in order to enable interworking between CN 320 and CN 420.

Although not shown by FIG. 3, system 300 may include multiple RAN nodes 311 wherein an Xn interface is defined between two or more RAN nodes 311 (e.g., gNBs and the like) that connecting to 5GC 320, between a RAN node 311 (e.g., gNB) connecting to 5GC 320 and an eNB (e.g., a RAN node 411 of FIG. 4), and/or between two eNBs connecting to 5GC 320.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 301 in a connected mode (e.g., CM-CONNECTED) including functionality to manage the UE mobility for connected mode between one or more RAN nodes 311. The mobility support may include context transfer from an old (source) serving RAN node 311 to new (target) serving RAN node 311; and control of user plane tunnels between old (source) serving RAN node 311 to new (target) serving RAN node 311.

A protocol stack of the Xn-U may include a transport network layer built on Internet Protocol (IP) transport layer, and a GTP-U layer on top of a user datagram protocol (UDP) and/or IP layer(s) to carry user plane PDUs. The Xn-C protocol stack may include an application layer signaling protocol (referred to as Xn Application Protocol (Xn-AP)) and a transport network layer that is built on an Stream Control Transmission Protocol (SCTP) layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 4:
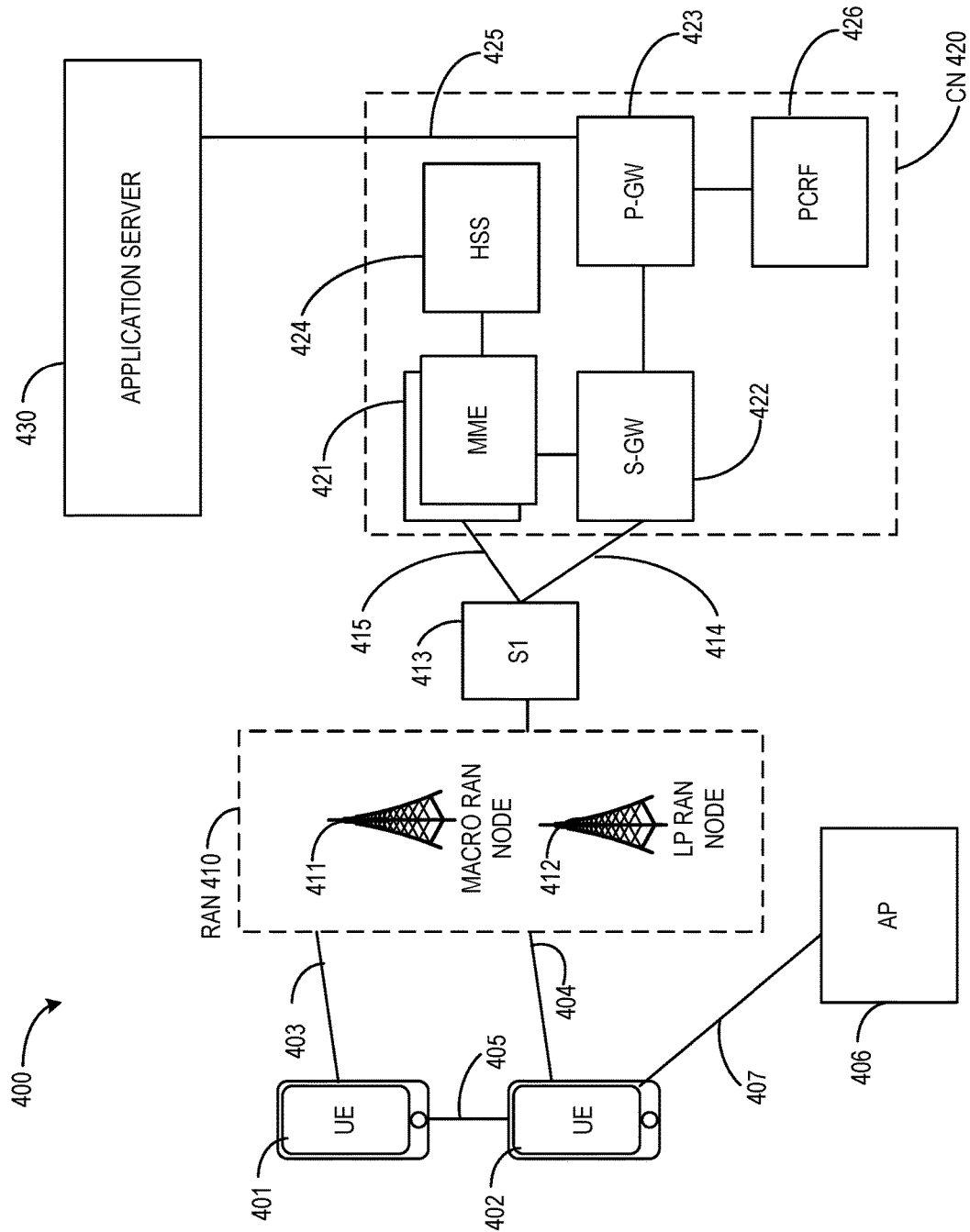
FIG. 4 illustrates an architecture of a system of a network consistent with embodiments disclosed herein.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., hand-held touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410. The RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including, but not limited to, a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (Wi-Fi®) router. In this example, the AP 406 may be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and a serving gateway (S-GW) 422, and an S1-mobility management entity (MME) interface 415, which is a signaling interface between the RAN nodes 411 and 412 and MMEs 421.

In this embodiment, the CN 420 comprises the MMEs 421, the S-GW 422, a Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the CN 420 (e.g., an EPC network) and external networks such as a network including the application server 430 (alternatively referred to as application function (AF)) via an Internet Protocol (IP) interface 425. Generally, an application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. A Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
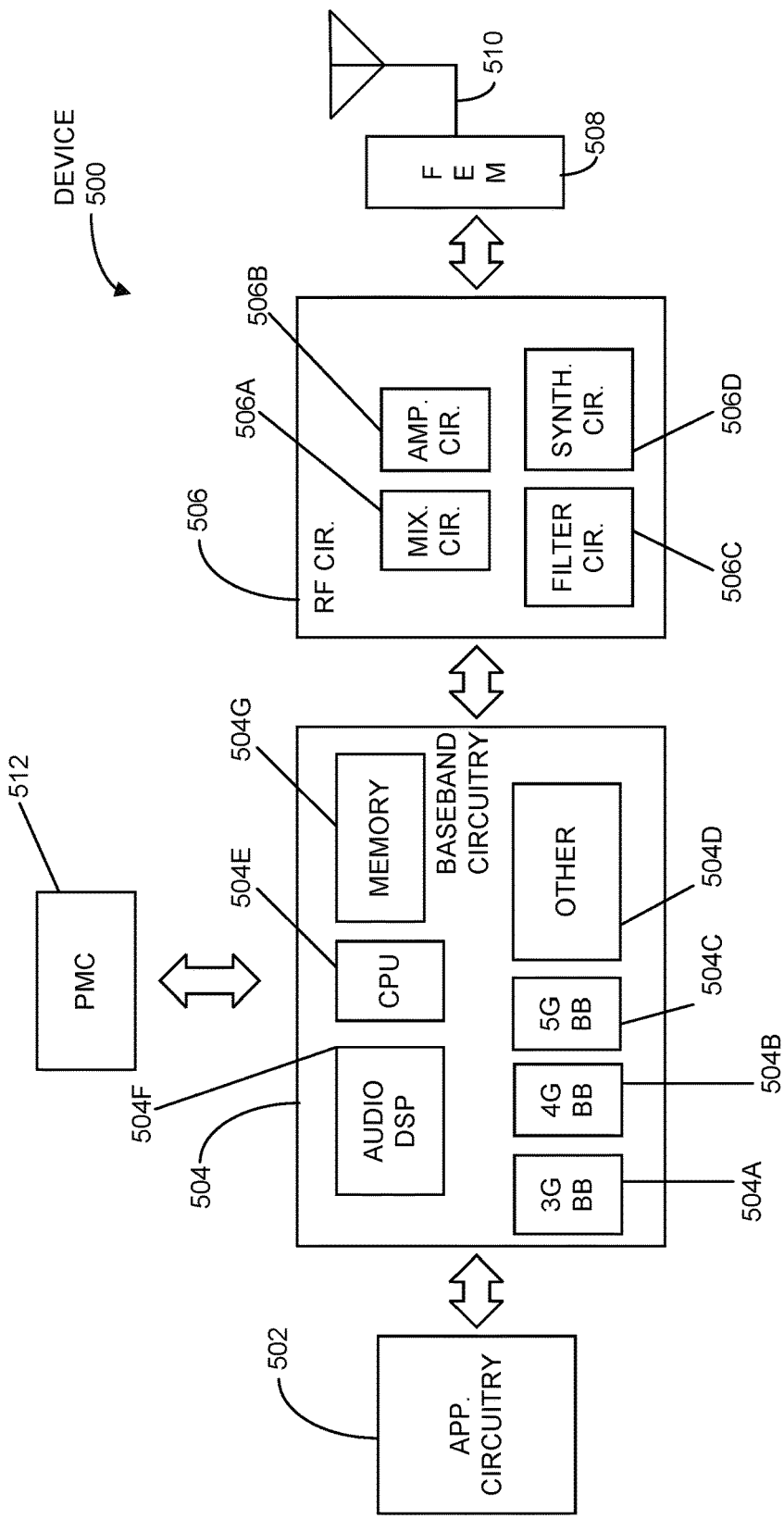
FIG. 5 illustrates example components of a device consistent with embodiments disclosed herein.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (E-UTRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. The RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by the filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. The FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM circuitry 508, or in both the RF circuitry 506 and the FEM circuitry 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by the RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device 500 is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, the application circuitry 502, the RF circuitry 506, or the FEM circuitry 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
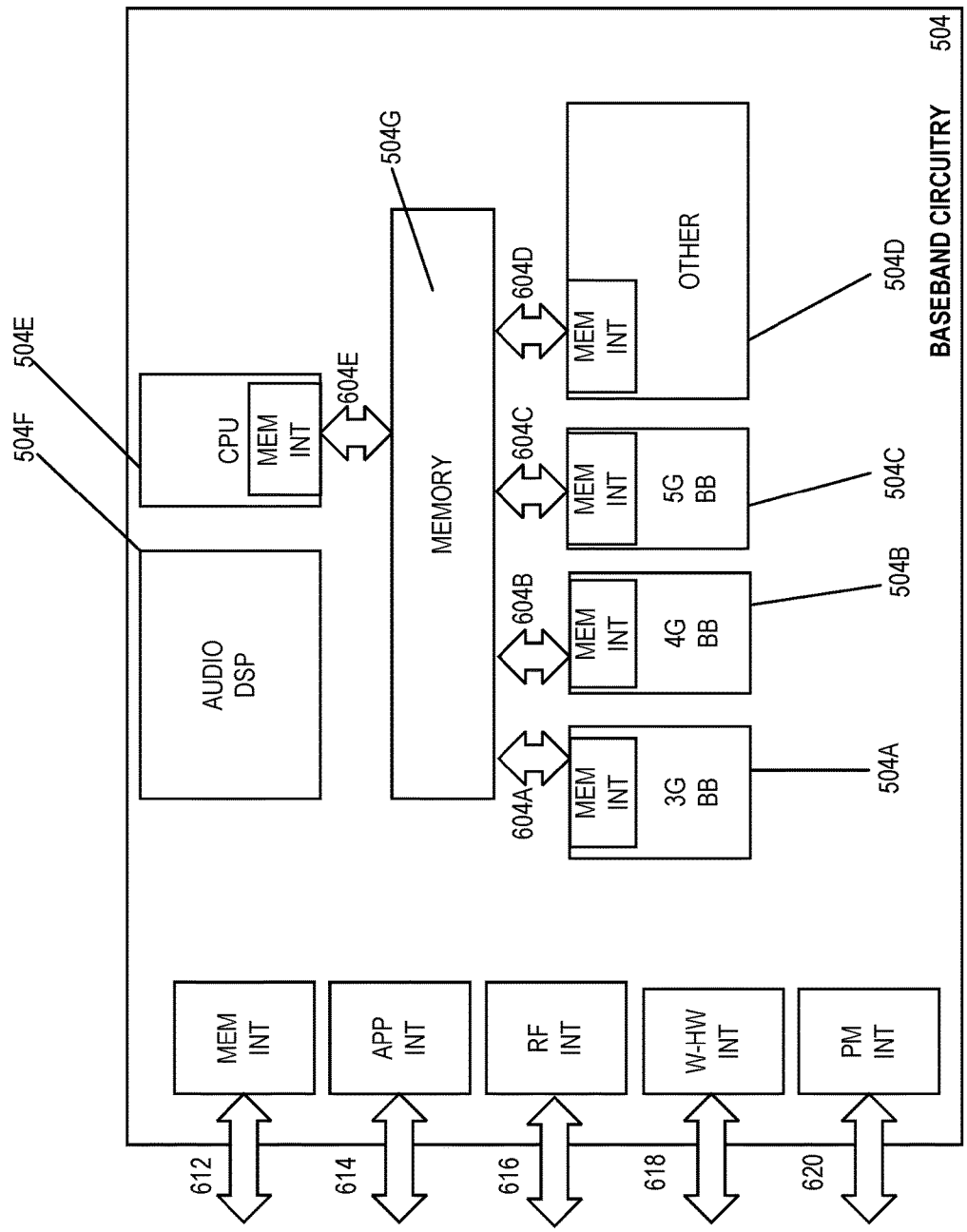
FIG. 6 illustrates example interfaces of baseband circuitry consistent with embodiments disclosed herein.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
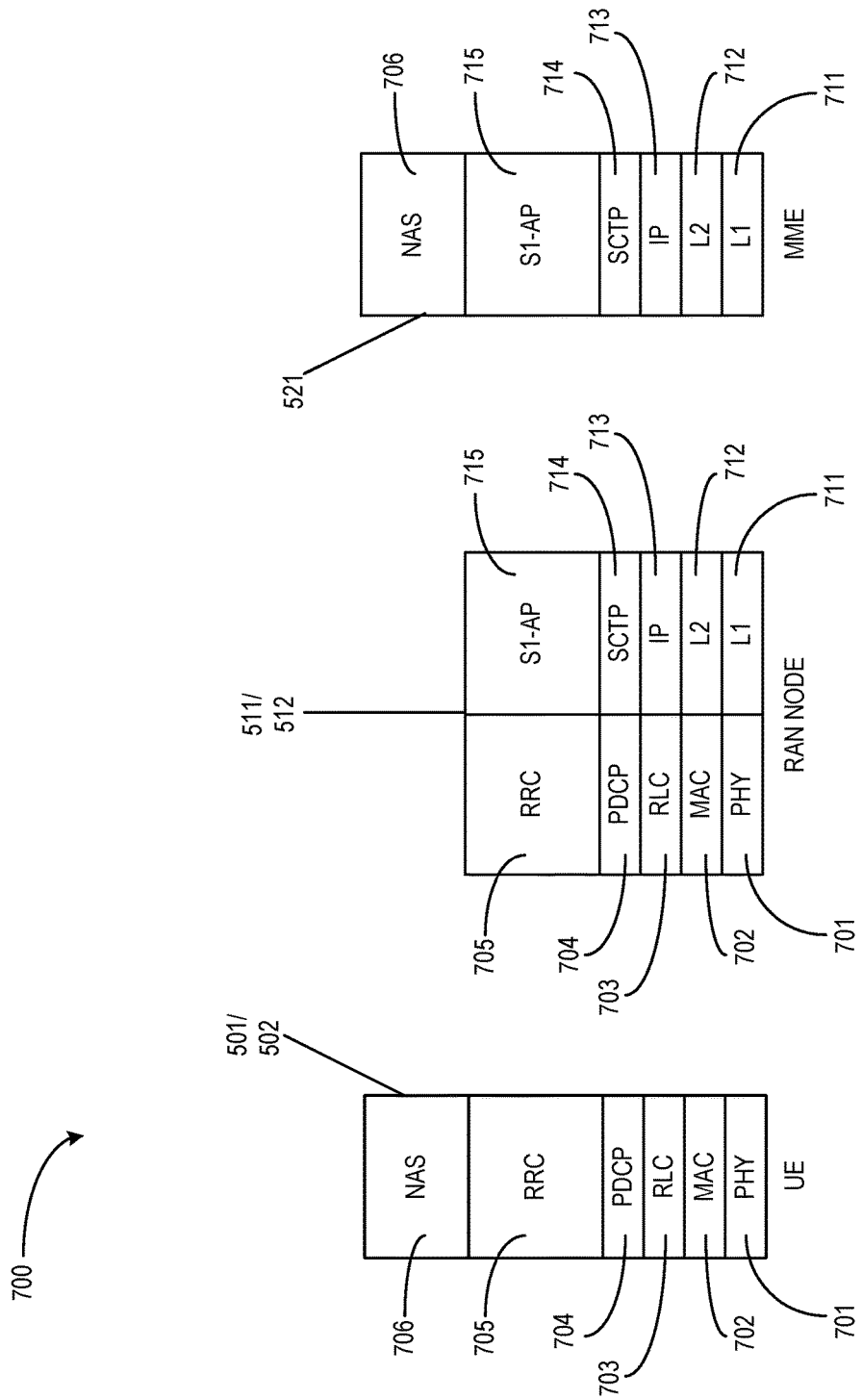
FIG. 7 is an illustration of a control plane protocol stack consistent with embodiments disclosed herein.

FIG. 7 is an illustration of a control plane protocol stack in accordance with some embodiments. In this embodiment, a control plane 700 is shown as a communications protocol stack between the UE 401 (or alternatively, the UE 402), the RAN node 411 (or alternatively, the RAN node 412), and the MME 421.

A PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as an RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 401 and the RAN node 411 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

In the embodiment shown, the non-access stratum (NAS) protocols 706 form the highest stratum of the control plane 700 between the UE 401 and the MME 421. The NAS protocols 706 support the mobility of the UE 401 and the session management procedures to establish and maintain IP connectivity between the UE 401 and the P-GW 423.

The S1 Application Protocol (S1-AP) layer 715 may support the functions of the S1 interface and comprise Elementary Procedures (EPs). An EP is a unit of interaction between the RAN node 411 and the CN 420. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 714 may ensure reliable delivery of signaling messages between the RAN node 411 and the MME 421 based, in part, on the IP protocol, supported by an IP layer 713. An L2 layer 712 and an L1 layer 711 may refer to communication links (e.g., wired or wireless) used by the RAN node 411 and the MME 421 to exchange information.

The RAN node 411 and the MME 421 may utilize an S1-MME interface to exchange control plane data via a protocol stack comprising the L1 layer 711, the L2 layer 712, the IP layer 713, the SCTP layer 714, and the S1-AP layer 715.

Figure 8:
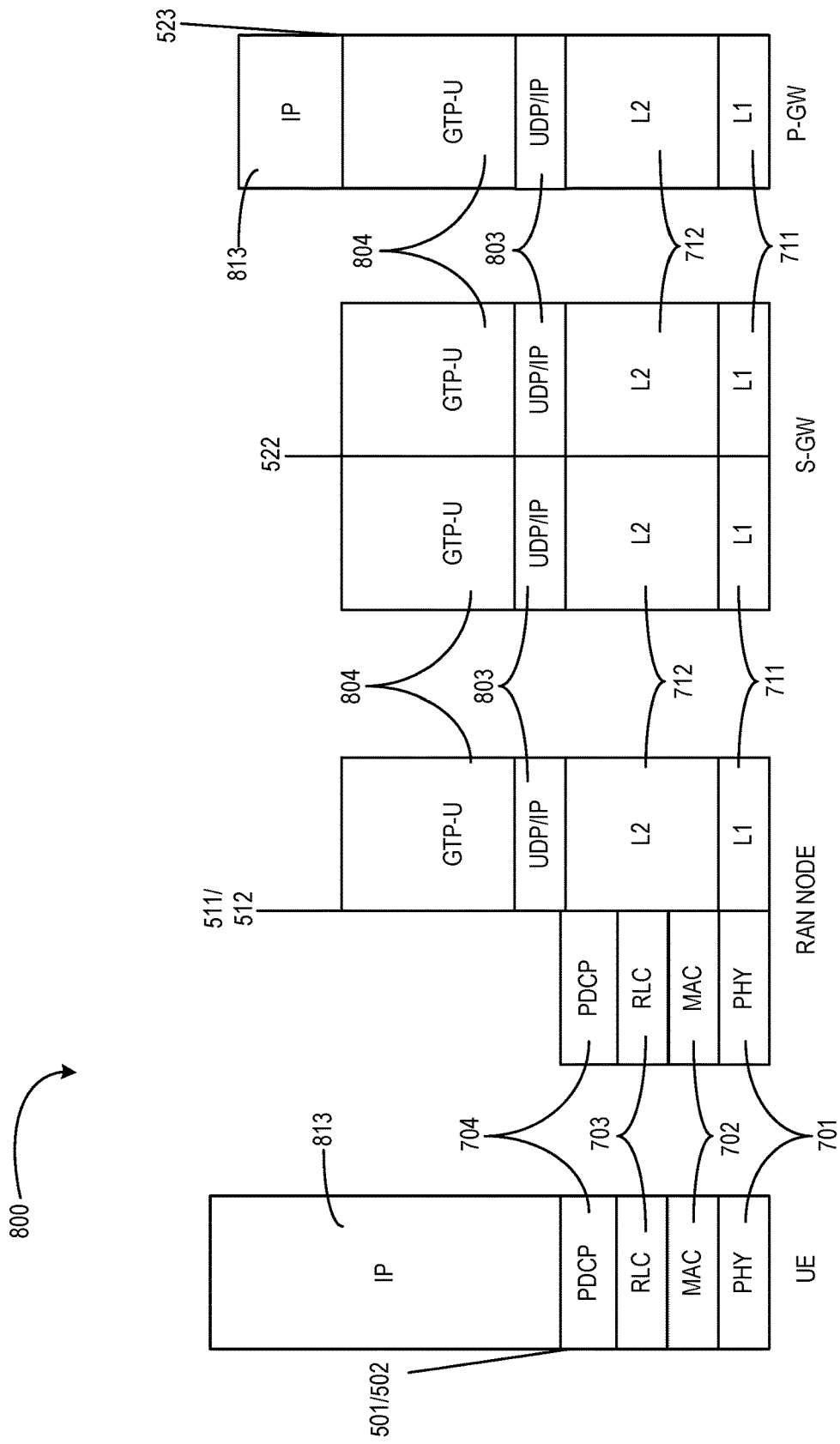
FIG. 8 is an illustration of a user plane protocol stack consistent with embodiments disclosed herein.

FIG. 8 is an illustration of a user plane protocol stack in accordance with some embodiments. In this embodiment, a user plane 800 is shown as a communications protocol stack between the UE 401 (or alternatively, the UE 402), the RAN node 411 (or alternatively, the RAN node 412), the S-GW 422, and the P-GW 423. The user plane 800 may utilize at least some of the same protocol layers as the control plane 700. For example, the UE 401 and the RAN node 411 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 411 and the S-GW 422 may utilize an S1-U interface to exchange user plane data via a protocol stack comprising the L1 layer 711, the L2 layer 712, the UDP/IP layer 803, and the GTP-U layer 804. The S-GW 422 and the P-GW 423 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols 706 support the mobility of the UE 401 and the session management procedures to establish and maintain IP connectivity between the UE 401 and the P-GW 423.

Figure 9:
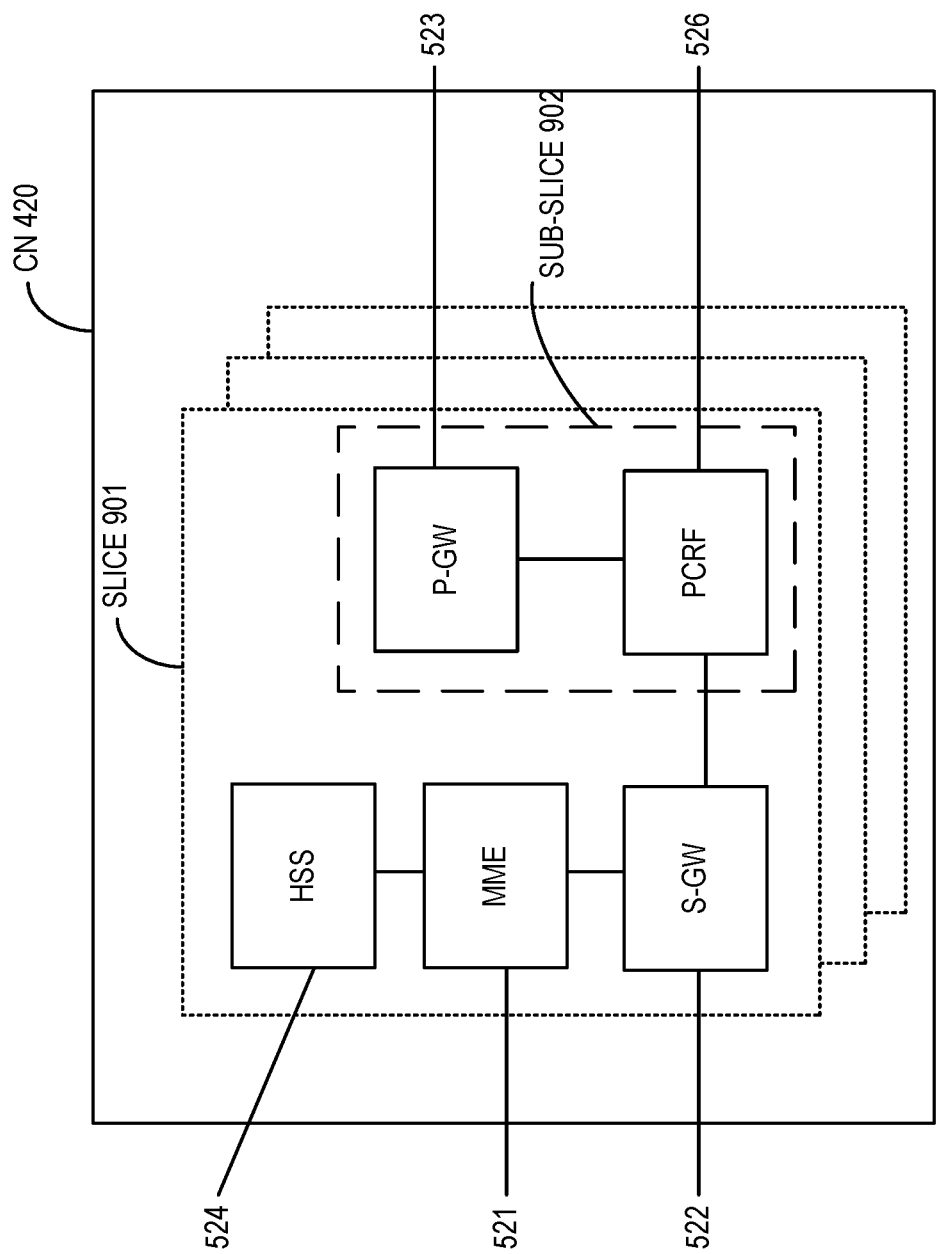
FIG. 9 illustrates components of a core network consistent with embodiments disclosed herein.

FIG. 9 illustrates components of a core network in accordance with some embodiments. The components of the CN 420 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 420 may be referred to as a network slice 901. A logical instantiation of a portion of the CN 420 may be referred to as a network sub-slice 902 (e.g., the network sub-slice 902 is shown to include the P-GW 423 and the PCRF 426).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
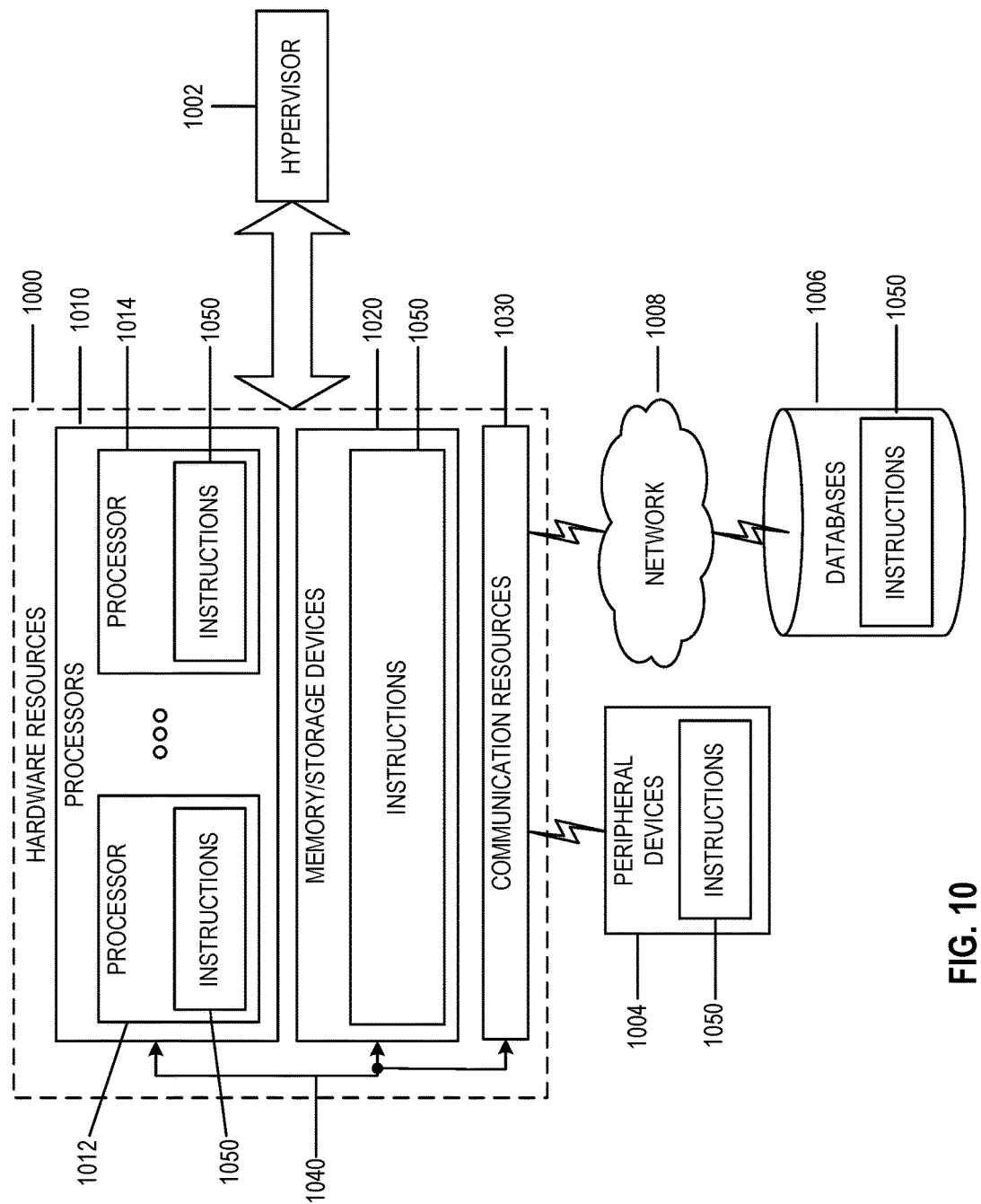
FIG. 10 is a block diagram illustrating components able to read instructions from a machine-readable or computer-readable medium and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

EXAMPLES

The following examples pertain to further embodiments.

Example 1 is an apparatus for a user equipment (UE), comprising: a cellular interface configured to couple to a transmitter wirelessly coupled to a next generation NodeB (gNB); and a processor coupled to the cellular interface, the processor configured to: process a reference signal received power (RSRP) measurement value; determine whether the s-Measure configuration is set for an RSRP of a new radio (NR) synchronization signal block (SSB) or an RSRP of a channel state indicator reference signal (CSI-RS); and when the s-Measure configuration is set for RSRP of NR SSB: determine whether the RSRP measurement value based on an NR SSB is less than an s-Measure value; and when the RSRP measurement value based on an NR SSB is less than an s-Measure value, perform additional NR SSB measurements; when the s-Measure configuration is set for RSRP of CSI-RS: determine whether the RSRP measurement value based on a CSI-RS is less than the s-Measure value; and when the RSRP measurement value based on a CSI-RS is less than an s-Measure value, perform additional CSI-RS measurements.

Example 2 is the apparatus of Example 1, wherein the additional NR SSB measurements are cell measurement results.

Example 3 is the apparatus of Example 1, wherein the additional CSI-RS measurements are cell measurement results.

Example 4 is the apparatus of Example 1, further comprising: processing a network configuration from the gNB using a radio resource control (RRC) message including an indicator of s-Measure for NR SSB or s-Measure for CSI-RS and an s-Measure value; and storing the s-Measure value and an indication of NR SSB or CSI-RS.

Example 5 is the apparatus of Example 1, wherein the s-Measure configuration can only be set to a single indicator, including NR SSB or CSI-RS.

Example 6 is the apparatus of Example 1, wherein when the s-Measure configuration is set for RSRP of NR SSB and when the RSRP measurement value based on an NR SSB is greater than or equal to the s-Measure value, skip additional NR SSB measurements.

Example 7 is the apparatus of Example 1, wherein when the s-Measure configuration is set for RSRP of CSI-RS and when the RSRP measurement value based on a CSI-RS is greater than or equal to the s-Measure value, skip additional CSI-RS measurements.

Example 8 is the apparatus of Example 1, wherein when the s-Measure configuration is set for RSRP of NR SSB and an RRC message indicates an s-Measure value for RSRP of CSI-RS, store the s-Measure value and set the s-Measure configuration for RSRP of CSI-RS.

Example 9 is the apparatus of Example 1, wherein when the s-Measure configuration is set for RSRP of CSI-RS and an RRC message indicates an s-Measure value for RSRP of NR SSB, store the s-Measure value and set the s-Measure configuration for RSRP of NR SSB.

Example 10 is an apparatus for a radio access network (RAN) node, comprising: a memory interface configured to be coupled to memory and configured to store and access an s-Measure configuration; a processor coupled to the cellular interface, the processor configured to: determine to configure a user equipment (UE) for an s-Measure configuration for either a reference signal received power (RSRP) of a new radio (NR) synchronization signal block (SSB) or an RSRP of a channel state indicator reference signal (CSI-RS); when determined to set the s-Measure configuration for RSRP of NR SSB, generate an RRC message including a measurement configuration information element indicating an s-Measure configuration for RSRP of NR SSB and an s-Measure value; when determined to set the s-Measure configuration for RSRP of CSI-RS, generate an RRC message including a measurement configuration information element indicating an s-Measure configuration for RSRP of CSI-RS and an s-Measure value; and provide the RRC message for transmission to a UE for s-Measure configuration.

Example 11 is the RAN node of Example 10, wherein the RAN node is further configured to process cell measurement results.

Example 12 is the RAN node of Example 10, wherein the processor is further configured to adjust the s-Measure value to trigger a UE to provide cell measurements when an RSRP value of a measured RSRP of NR SSB is below a threshold.

Example 13 is the RAN node of Example 10, wherein the processor is further configured to adjust the s-Measure value to trigger a UE to provide cell measurements when an RSRP value of a measured RSRP of CSI-RS is below a threshold.

Example 14 is the RAN node of Example 10, wherein the processor is further configured to adjust the s-Measure value to trigger a UE to skip cell measurements when an RSRP value of a measured RSRP of NR SSB is greater than or equal to a threshold.

Example 15 is the RAN node of Example 10, wherein the processor is further configured to adjust the s-Measure value to trigger a UE to skip cell measurements when an RSRP value of a measured RSRP of CSI-RS greater than or equal to a threshold.

Example 16 is the RAN node of Example 10, wherein the measurement configuration information element is a MeasConfig information element that includes a threshold value for RSRP and a choice of NR SSB or CSI-RS.

Example 17 is a method of determining whether to perform cell measurements by a user equipment (UE): process a reference signal received power (RSRP) measurement result; determine whether the s-Measure configuration is set for an RSRP of a new radio (NR) synchronization signal block (SSB); and when the s-Measure configuration is set for RSRP of NR SSB: determine whether to perform cell measurements based on the s-Measure configuration for NR SSB and the RSRP measurement result; and when the s-Measure configuration is not set for RSRP of NR SSB: determine whether to perform cell measurements based on the s-Measure configuration for channel state indicator reference signal (CSI-RS) and the RSRP measurement result.

Example 18 is the method of Example 17, wherein when the s-Measure configuration is set for RSRP of NR SSB, and when the RSRP measurement satisfies the s-Measure configuration for NR SSB or the RSRP measurement satisfies an s-Measure configuration for CSI-RS, skip further cell measurements.

Example 19 is the method of Example 17, wherein when the s-Measure configuration is set for RSRP of NR SSB, and when an NR SSB RSRP measurement satisfies the s-Measure configuration for NR SSB, skip further NR SSB cell measurements.

Example 20 is the method of Example 17, further comprising: determine whether the s-Measure configuration is set for an RSRP of CSI-RS; and when the s-Measure configuration is set for RSRP of CSI-RS and when a CSI-RS RSRP measurement satisfies the s-Measure configuration for CSI-RS, skip further CSI-RS cell measurements.

Example 21 is a method of determining whether to perform cell measurements by a user equipment (UE): process a reference signal received power (RSRP) measurement value; determine whether the s-Measure configuration is set for an RSRP of a new radio (NR) synchronization signal block (SSB) or an RSRP of a channel state indicator reference signal (CSI-RS); and when the s-Measure configuration is set for RSRP of NR SSB: determine whether the RSRP measurement value based on an NR SSB is less than an s-Measure value; and when the RSRP measurement value based on an NR SSB is less than an s-Measure value, perform additional NR SSB measurements; and when the s-Measure configuration is set for RSRP of CSI-RS: determine whether the RSRP measurement value based on a CSI-RS is less than the s-Measure value; and when the RSRP measurement value based on a CSI-RS is less than an s-Measure value, perform additional CSI-RS measurements.

Example 22 is a computer program product comprising a computer-readable storage medium that stores instructions for execution by a processor to perform operations of a user equipment (UE), the operations, when executed by the processor, to perform a method, the method comprising: process one or more configurations from the g Node B (gNB) that include a first s-Measure for a new radio (NR) synchronization signal (SS) block and a second s-Measure for a channel state indicator reference signal (CSI-RS); determine a first reference signal received power (RSRP) value for a received NR SS block; determine a second RSRP value for a received CSI-RS block; determine a first indication of whether the first RSRP value is greater than the first s-Measure; determine a second indication of whether the second RSRP value is greater than the second s-Measure; and determine whether to perform neighboring measurements on neighbor cells based on the first indication and the second indication.

Example 23 is an apparatus for determining whether to perform cell measurements by a user equipment (UE), the apparatus comprising: means for processing a reference signal received power (RSRP) measurement value; means for determining whether the s-Measure configuration is set for an RSRP of a new radio (NR) synchronization signal block (SSB) or an RSRP of a channel state indicator reference signal (CSI-RS); means for when the s-Measure configuration is set for RSRP of NR SSB, determining whether the RSRP measurement value based on an NR SSB is less than an s-Measure value, and when the RSRP measurement value based on an NR SSB is less than an s-Measure value, performing additional NR SSB measurements; means for when the s-Measure configuration is set for RSRP of CSI-RS, determining whether the RSRP measurement value based on a CSI-RS is less than the s-Measure value, and when the RSRP measurement value based on a CSI-RS is less than an s-Measure value, perform additional CSI-RS measurements.

ADDITIONAL EXAMPLES

Additional Example 1 is when an SS block s-Measure or a CSI-RS s-Measure is satisfied, the UE does not need to perform measurement.

Additional Example 2 is when both an SS block and a CSI-RS s-Measure are satisfied, then UE is not required to perform measurement.

Additional Example 3 is when a network can only configure one (i.e., SS block s-Measure or CSI-RS s-Measure).

Additional Example 4 is when the UE does not measure SS block if an SS block s-Measure is satisfied. UE does not measure CSI-RS if a CSI-RS s-Measure is satisfied.

Additional Example 5 may include an apparatus comprising: a determination means for identifying an s-Measure configuration, wherein the s-Measure configuration is to indicate one or more s-Measure values defining when to perform one or more other measurements; and a measurement means for performing cell level measurements, and for performing the one or more other measurements when cell measurement values of the cell level measurements exceed the one or more s-Measure values.

Additional Example 6 may include the apparatus of Additional Example 5 and/or some other examples herein, wherein the one or more signals comprise a synchronization signal block (SSB) and a channel state information reference signal (CSI-RS), and wherein the s-Measure configuration is to indicate a CSI-RS s-Measure value and an SSB s-Measure value.

Additional Example 7 may include the apparatus of Additional Example 6 and/or some other examples herein, wherein the measurement means is for not performing the one or more other measurements for a satisfied one of the cell level measurement performed on the SSB or the CSI-RS such that: the measurement means is for not performing the one or more other measurements when a cell level measurement of the SSB is exceeds the SSB s-Measure value; and/or the measurement means is for not performing the one or more other measurements when a cell level measurement of the CSI-RS exceeds the CSI-RS s-Measure value.

Additional Example 8 may include the apparatus of Additional Example 6 and/or some other examples herein, wherein the measurement means is for not performing the one or more other measurements for the SSB and the CSI-RS when a cell level measurement of the SSB exceeds the SSB s-Measure value and when a cell level measurement of the CSI-RS exceeds the CSI-RS s-Measure value.

Additional Example 9 may include the apparatus of Additional Example 6 and/or some other examples herein, wherein the measurement means is for performing the one or more other measurements for an unsatisfied one of the cell level measurement performed on the SSB or the CSI-RS such that: the measurement means is for performing the one or more other measurements only on the CSI-RS when a cell level measurement of the SSB exceeds the SSB s-Measure value; and/or the measurement means is for performing the one or more other measurements only on the SSB when a cell level measurement of the CSI-RS exceeds the CSI-RS s-Measure value.

Additional Example 10 may include the apparatus of Additional Example 5 and/or some other examples herein, wherein the one or more signals comprise an SSB and a CSI-RS, and wherein the s-Measure configuration is to indicate only a CSI-RS s-Measure value or an SSB s-Measure value.

Additional Example 11 may include the apparatus of Additional Examples 5-10 and/or some other examples herein, wherein the s-Measure configuration is included in a received Radio Resource Control (RRC) message.

Additional Example 12 may include the apparatus of Additional Examples 5-11 and/or some other examples herein, wherein the apparatus is implemented in or by a user equipment (UE).

Additional Example 13 may include an apparatus comprising means to perform one or more elements of a method described in or related to any of Additional Examples 1-12, or any other method or process described herein.

Additional Example 14 may include one or more non-transitory computer-readable media comprising instructions to cause an electronic device, upon execution of the instructions by one or more processors of the electronic device, to perform one or more elements of a method described in or related to any of Additional Examples 1-12, or any other method or process described herein.

Additional Example 15 may include an apparatus comprising logic, modules, or circuitry to perform one or more elements of a method described in or related to any of Additional Examples 1-12, or any other method or process described herein.

Additional Example 16 may include a method, technique, or process as described in or related to any of Additional Examples 1-12, or portions or parts thereof.

Additional Example 17 may include an apparatus comprising: one or more processors and one or more computer readable media comprising instructions that, when executed by the one or more processors, cause the one or more processors to perform the method, techniques, or process as described in or related to any of Additional Examples 1-12, or portions thereof.

Additional Example 18 may include a signal as described in or related to any of Additional Examples 1-12, or portions or parts thereof.

Additional Example 19 may include a signal in a wireless network as shown and described herein.

Additional Example 20 may include a method of communicating in a wireless network as shown and described herein.

Additional Example 21 may include a system for providing wireless communication as shown and described herein.

Additional Example 22 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a user equipment (UE), comprising:
a cellular interface configured to couple to a transmitter wirelessly coupled to a next generation NodeB (gNB); and
a processor coupled to the cellular interface, the processor configured to:
process a reference signal received power (RSRP) measurement value;
determine whether an s-Measure configuration is set for an RSRP of a new radio (NR) synchronization signal block (SSB) or an RSRP of a channel state indicator reference signal (CSI-RS), the s-Measure configuration including an s-Measure value indicating an RSRP threshold and an indication of a selection of either NR-SSB or CSI-RS;
when the s-Measure configuration is set for RSRP of NR SSB:
determine whether the RSRP measurement value based on an NR SSB is less than the s-Measure value; and
when the RSRP measurement value based on an NR SSB is less than the s-Measure value, perform additional NR SSB measurements;
when the s-Measure configuration is set for RSRP of CSI-RS:
determine whether the RSRP measurement value based on CSI-RS is less than the s-Measure value; and when the RSRP measurement value based on CSI-RS is less than the s-Measure value, perform additional CSI-RS measurements.

2. The apparatus of claim 1, wherein the additional NR SSB measurements are cell measurement results.

3. The apparatus of claim 1, wherein the additional CSI-RS measurements are cell measurement results.

4. The apparatus of claim 1, further comprising:
processing a network configuration from the gNB using a radio resource control (RRC) message including an indicator of s-Measure for NR SSB or s-Measure for CSI-RS and an s-Measure value; and
storing the s-Measure value and an indication of NR SSB or CSI-RS.

5. The apparatus of claim 1, wherein the s-Measure configuration can only be set to a single indicator, including NR SSB or CSI-RS.

6. The apparatus of claim 1, wherein when the s-Measure configuration is set for RSRP of NR SSB and when the RSRP measurement value based on an NR SSB is greater than or equal to the s-Measure value, skip additional NR SSB measurements.

7. The apparatus of claim 1, wherein when the s-Measure configuration is set for RSRP of CSI-RS and when the RSRP measurement value based on CSI-RS is greater than or equal to the s-Measure value, skip additional CSI-RS measurements.

8. The apparatus of claim 1, wherein when the s-Measure configuration is set for RSRP of NR SSB and an RRC message indicates an s-Measure value for RSRP of CSI-RS, store the s-Measure value and set the s-Measure configuration for RSRP of CSI-RS.

9. The apparatus of claim 1, wherein when the s-Measure configuration is set for RSRP of CSI-RS and an RRC message indicates an s-Measure value for RSRP of NR SSB, store the s-Measure value and set the s-Measure configuration for RSRP of NR SSB.

10. An apparatus for a radio access network (RAN) node, comprising:
a memory interface configured to be coupled to memory and configured to store and access an s-Measure configuration;
a processor coupled to the cellular interface, the processor configured to:
determine to configure a user equipment (UE) for an s-Measure configuration for either a reference signal received power (RSRP) of a new radio (NR) synchronization signal block (SSB) or an RSRP of a channel state indicator reference signal (CSI-RS);
when determined to set the s-Measure configuration for RSRP of NR SSB, generate an RRC message including a measurement configuration information element indicating an s-Measure configuration for RSRP of NR SSB and an s-Measure value;
when determined to set the s-Measure configuration for RSRP of CSI-RS, generate an RRC message including a measurement configuration information element indicating an s-Measure configuration for RSRP of CSI-RS and an s-Measure value; and
provide the RRC message for transmission to a UE for s-Measure configuration.

11. The apparatus of claim 10, wherein the RAN node is further configured to process cell measurement results.

12. The apparatus of claim 10, wherein the processor is further configured to adjust the s-Measure value to trigger a UE to provide cell measurements when an RSRP value of a measured RSRP of NR SSB is below a threshold.

13. The apparatus of claim 10, wherein the processor is further configured to adjust the s-Measure value to trigger a UE to provide cell measurements when an RSRP value of a measured RSRP of CSI-RS is below a threshold.

14. The apparatus of claim 10, wherein the processor is further to adjust the s-Measure value to trigger a UE to skip cell measurements when an RSRP value of a measured RSRP of NR SSB is greater than or equal to a threshold.

15. The apparatus of claim 10, wherein the processor is further to adjust the s-Measure value to trigger a UE to skip cell measurements when an RSRP value of a measured RSRP of CSI-RS greater than or equal to a threshold.

16. The apparatus of claim 10, wherein the measurement configuration information element is a MeasConfig information element that includes a threshold value for RSRP and a choice of NR SSB or CSI-RS.

17. A computer program product comprising a non-transitory computer-readable storage medium that stores instructions for execution by a processor to perform operations of a user equipment (UE), the operations, when executed by the processor, to perform a method, the method comprising:
process a reference signal received power (RSRP) measurement value;
determine whether an s-Measure configuration is set for an RSRP of a new radio (NR) synchronization signal block (SSB) or an RSRP of a channel state indicator reference signal (CSI-RS);
when the s-Measure configuration is set for RSRP of NR SSB:
determine whether the RSRP measurement value based on an NR SSB is less than an s-Measure value; and
when the RSRP measurement value based on an NR SSB is less than an s-Measure value, perform additional NR SSB measurements; and
when the s-Measure configuration is set for RSRP of CSI-RS:
determine whether the RSRP measurement value based on CSI-RS is less than the s-Measure value; and
when the RSRP measurement value based on CSI-RS is less than a s-Measure value, perform additional CSI-RS measurements.

18. The computer program product of claim 17, wherein the additional NR SSB measurements are cell measurement results, and wherein the additional CSI-RS measurements are cell measurement results.

19. The computer program product of claim 17, further comprising to process a network configuration from the gNB using a radio resource control (RRC) message including an indicator of s-Measure for NR SSB or s-Measure for CSI-RS and an s-Measure value; and store the s-Measure value and an indication of NR SSB or CSI-RS.

20. The computer program product of claim 17, wherein the s-Measure configuration can only be set to a single indicator, including NR SSB or CSI-RS.

* * * * *